A. J. BALDWIN.
MACHINE FOR MAKING WIRE GLASS.
APPLICATION FILED NOV. 2, 1908.
957,594.
Patented May 10, 1910.
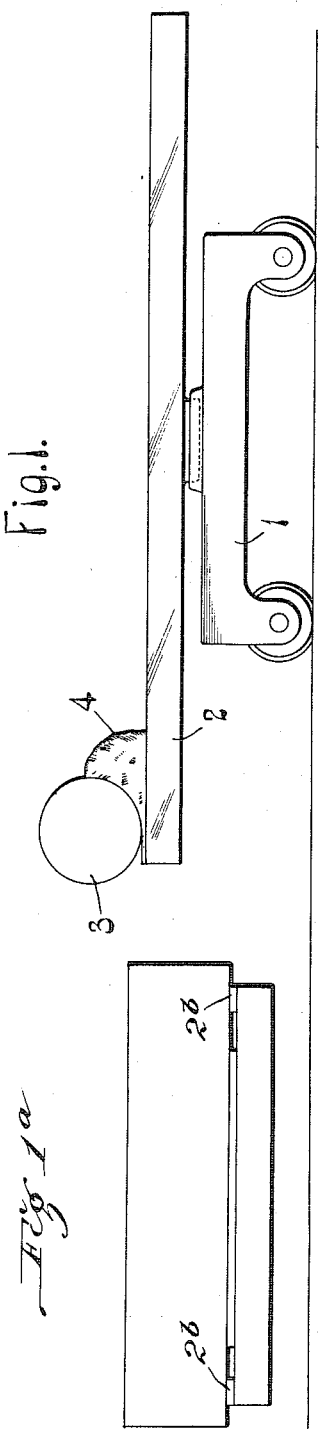
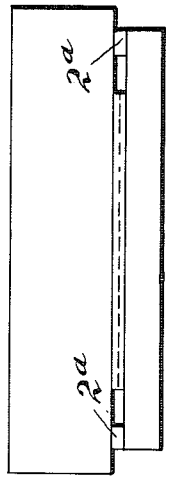
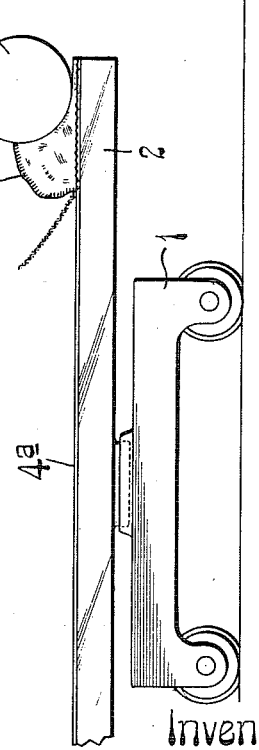
Witnesses
A. J. McCauley
George Ladson
Inventor:
Arthur J. Baldwin
by Bakewell Kerr ull Abby's

UNITED STATES PATENT OFFICE.

ARTHUR J. BALDWIN, OF EAST ORANGE, NEW JERSEY.

MACHINE FOR MAKING WIRE-GLASS.

957,594. Specification of Letters Patent. Patented May 10, 1910.

Application filed November 2, 1908. Serial No. 460,678.

*To all whom it may concern:*

Be it known that I, ARTHUR J. BALDWIN, a citizen of the United States, residing at the city of East Orange, county of Essex, and State of New Jersey, have invented a certain new and useful Improvement in Machines for Making Wire-Glass, of which the following is a full, clear, and exact description, such as will enable others skilled in the art to which it appertains to make and use the same, reference being had to the accompanying drawings, forming part of this specification, in which—

Figure 1 is a vertical sectional view illustrating the first step in my improvement in making wire glass; Fig. $1^a$ is an end elevation of the parts seen in Fig. 1; Fig. 2 is a similar view illustrating the second step; and Fig. $2^a$ is an end view of the parts seen in Fig. 2.

This invention relates to a new and useful improvement in a machine for and method of making wire glass, the same consisting of means whereby a pour of molten glass is spread into sheet form on a table by a roller, said table being then turned end for end so as to present the front or cooler end of the sheet to the roller, the second pour being made upon this front or cooler end and the table then moved in the opposite direction so as to spread the finished layer or coat of glass upon the wire which, by the spreading of the second pour, is sandwiched between the two layers. So far as I am aware, it is new in the wire glass art to turn the table-bed end for end and move it in a direction opposite its initial movement under the same roller which initially spreads the first sheet of glass. It is obvious that different rollers could be used for the first and second operations, but I prefer to use the same roller. It is also obvious that in the second operation the strips or tracks on the table which determine the thickness of the sheet of glass may either be raised, or bearings of the roller adjusted upwardly in the second operation so as to allow for thickness of the second or finishing layer.

In the drawings, 1 indicates a truck which may be mounted on a suitable track or runway, said truck carrying the table-bed 2 pivotally mounted thereon so as to be capable of being swung end for end.

3 is the roller.

The first pour of glass 4 is spread into sheet form on the table, said roller being adjusted with respect to the surface of the table so as to allow the glass to be spread to the desired thickness as for instance, by means of the trangs $2^a$. When the table completely passes under the roller 3 it has a sheet of glass $4^a$ spread thereon, as shown in Fig. 2. The table-bed 2 may now be turned end for end so as to present the first formed and therefore the cooler end of the sheet to the roller 3. A wire mesh is now placed on the upper surface of the sheet $4^a$ under the roller 3, and the second pour 5 of fresh, hot glass is dumped onto the sheet $4^a$, but on the side of roller 3 opposite to that to which the first pour 4 was dumped. The truck 1 and its carried table are now moved under the roller 3 in a direction reverse to that employed in the first operation, so as to spread the finishing layer of glass over the wire. The roller 3 is, of course, adjusted vertically for the second operation so as to allow for the thickness of the second layer, trangs $2^b$ being used for this purpose.

Having thus described my invention, what I claim and desire to secure by Letters Patent of the United States is:

1. A machine for making wire glass comprising a roller, a truck, and a table pivotally mounted on said truck and capable of being turned end for end, in a horizontal plane, on said truck.

2. A machine for making wire glass comprising a table, a roller for spreading molten glass into sheet form on said table, means for reversing the table and presenting the first formed end of said sheet to said roller whereby a finishing layer of glass may be spread on said first formed sheet; substantially as described.

3. A machine for making wire glass comprising a table, a roller coöperating therewith for spreading molten glass into sheet form, and trangs of different thickness for adjusting said roller vertically with respect to said table whereby said roller may be caused to spread the final finishing layer of glass on the first formed sheet; substantially as described.

4. In a machine for making wire glass, the combination with a table, a roller for spreading a complete sheet of glass thereon, and means for reversing said table with respect to said roller, whereby the same roller spreads a second layer of glass over the first formed sheet, starting at the cooler end thereof.

5. In a machine for making wire glass, the combination with a truck, a table pivotally mounted thereon and reversible in a horizontal plane, and a roller arranged above the table at different distances so as to roll different thicknesses of glass at different passes of the table thereunder.

In testimony whereof I hereunto affix my signature in the presence of two witnesses, this 28th day of October 1908.

ARTHUR J. BALDWIN.

Witnesses:
WILLIAM DULLES,
PHILIP S. HILL.